(12) United States Patent
Santini et al.

(10) Patent No.: US 9,077,239 B2
(45) Date of Patent: Jul. 7, 2015

(54) VOLTAGE ADAPTOR FOR AC-DC POWER SUPPLY MODULES

(71) Applicant: Transistor Devices, Inc., Hackettstown, NJ (US)

(72) Inventors: John Santini, Columbia, NJ (US); Thomas A. Hansen, Long Valley, NJ (US); Gary Mulcahy, Flanders, NJ (US)

(73) Assignee: Transistor Devices, Inc., Hackettstown, NJ (US)

( * ) Notice: Subject to any disclaimer, the term of this patent is extended or adjusted under 35 U.S.C. 154(b) by 197 days.

(21) Appl. No.: 13/791,002

(22) Filed: Mar. 8, 2013

(65) Prior Publication Data

US 2014/0254218 A1 Sep. 11, 2014

(51) Int. Cl.
*H02M 7/08* (2006.01)
*H02M 1/00* (2007.01)

(52) U.S. Cl.
CPC ........ *H02M 7/08* (2013.01); *H02M 2001/0074* (2013.01)

(58) Field of Classification Search
USPC ........... 363/34, 37, 65, 67, 69, 70, 76, 77–81, 363/84, 89
See application file for complete search history.

(56) References Cited

U.S. PATENT DOCUMENTS

| | | | | |
|---|---|---|---|---|
| 5,311,419 | A * | 5/1994 | Shires | 363/65 |
| 7,710,751 | B2 * | 5/2010 | Nishino | 363/67 |
| 7,888,819 | B2 * | 2/2011 | Lee | 307/65 |
| 2005/0276082 | A1* | 12/2005 | Panda et al. | 363/70 |
| 2006/0083035 | A1* | 4/2006 | Lubomirsky | 363/67 |

* cited by examiner

*Primary Examiner* — Adolf Berhane
*Assistant Examiner* — Gary Nash
(74) *Attorney, Agent, or Firm* — Brown & Michaels, PC

(57) ABSTRACT

A circuit for connecting lower AC voltage-rated AC-DC power supplies with higher voltage power sources. A power line matching transformer connecting the source to the power supplies needs only to support the self-dissipation and output current mismatch between supplies. The circuit can also protect the line matching transformer from overheating in various fault scenarios.

18 Claims, 3 Drawing Sheets they have. Ax typical switch mode power supply mod-
VOLTAGE ADAPTOR FOR AC-DC POWER SUPPLY MODULES

BACKGROUND OF THE INVENTION

1. Field of the Invention

The invention pertains to the field of power supply circuits. More particularly, the invention pertains to voltage adaptors for power supply modules which allow multiple modules with a lower AC voltage input requirement to be used with a higher AC voltage supply.

2. Description of Related Art

Very often it is required to deploy switch mode AC-DC power conversion assemblies powered from a 380V or 440V or 480V, three phase power system where no neutral connection is available. As typical switch mode power supply modules are designed to operate from a 208V or 220V or 230V or 240V power line, this is typically achieved by utilizing a power line frequency step down transformer that has to carry the entire rated power of the system. This entails uneconomical usage of space, excessive weight and increased cost.

While it is possible to specifically design AC-DC power supplies to work from a 380-440-480VAC power line, this generally requires a significant design effort that many times is beyond the economic scope of the program. A design technology that enables the use of preexisting power supply modules rated to 208-220-230-240VAC input without an excessively large, heavy and expensive step down transformer is warranted.

SUMMARY OF THE INVENTION

The invention provides a circuit for connecting lower AC voltage-rated (for example, 208-220-230-240VAC) AC-DC power supplies with higher voltage (for example 380-440-480VAC) power lines. By using the invention, the power line matching transformer no longer needs to supply the rated input power of the supplies, but rather need only support the self-dissipation and output current mismatch between supplies. The circuit technology also protects the line matching transformer from overheating in various fault scenarios.

DETAILED DESCRIPTION OF THE INVENTION

Figure 1:
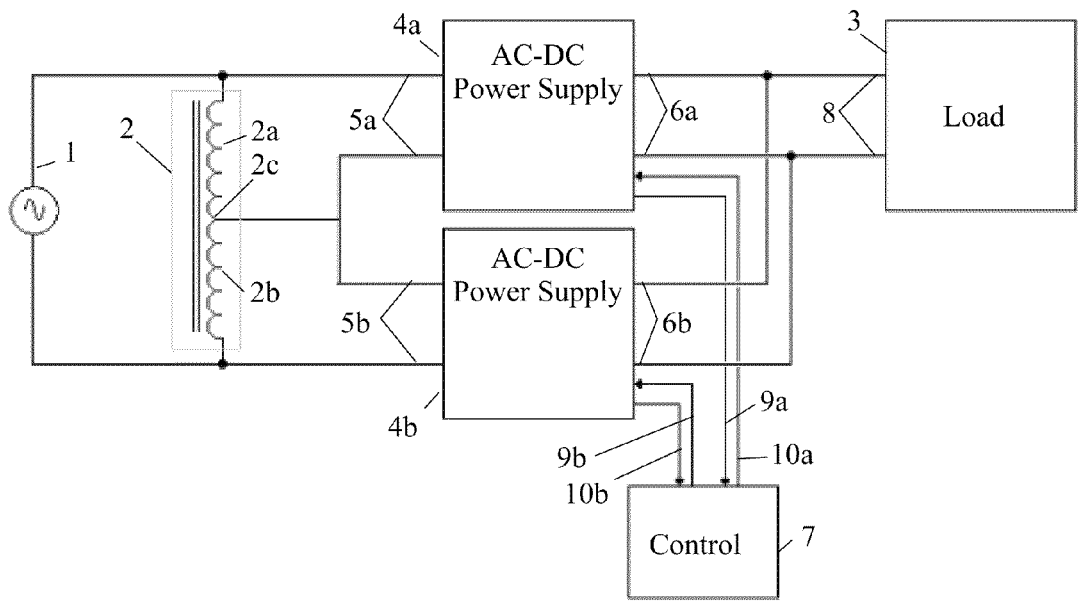
FIG. 1 shows a block diagram of a first embodiment of the invention.

FIGS. 1-5 show various embodiments of the invention. In each of the figures, an AC power source 1 supplies two AC-DC power supplies 4a and 4b, each of which has a an AC power input 5a and 5b and a DC power output 6a and 6b. The DC outputs 6a and 6b are connected together to provide a DC output 8 to a common load 3.

A controller 7 (FIG. 1), 27 (FIG. 2) or 37 (FIG. 3) can assert a signal on a shut-down line 9a coupled to a shutdown input of power supply 4a, and also on a shut-down line 9b coupled to a shutdown input of power supply 4b. This allows the controller 7 or 27 or 37 to selectively shut down either or both of the power supplies 4a or 4b.

In one common requirement, AC source 1 may be, for example, a power line at 440 VAC, and the AC-DC power supplies 4a and 4b have an input voltage requirement of 220 VAC. It will be recognized that other voltage combinations are possible within the teachings of the invention.

Switch mode AC-DC power supplies have, as their nature, a negative resistance input impedance characteristic. If two supplies 4a 4b have their input circuits 5a 5b connected in series across an input power source, they will tend to share this voltage evenly if their input power is identical. As there may be variations in internal power losses from converter to converter (although these are typically small for a given converter type), and delivered output current to a common load 3 may vary (although modern converters are designed to share current to a high degree when powering a common load), a balancing mechanism is warranted to force the voltage split between the converters to be relatively equal. Otherwise, the converters may divide the input voltage in a non-uniform way to the extent where either one converter shuts down due to low voltage, or is damaged due to excessively high voltage.

In FIG. 1, each AC-DC power supply 4a 4b is configured to have the same circuit and components. These power supplies 4a 4b also feature output current sharing circuits that force their delivered output current to be within a specific tolerance of each other when powering a common load 3. This configuration then dictates the maximum input current or power imbalance to be bounded by the difference in internal dissipation within the supplies (equal to the energy conversion difference between the two units) and the difference in output current delivered by the units.

A line frequency transformer 2 is implemented in an autotransformer configuration to force input voltage balance between the AC inputs 5a and 5b of the two power supplies 4a and 4b. The transformer has a first winding 2a and a second winding 2b, of equal length, connected in series at a center tap 2c. The AC source 1 is connected to opposite ends of windings 2a and 2b. The AC input 5a of power supply 4a is connected across winding 2a, and the AC input 5b of power supply 4b is connected across winding 2b.

This transformer 2 need only be sized to carry the mismatch in input power between the two units 4a and 4b, not the total rated power of the system. For example, if each of the power supplies 4a and 4b are rated at 2.7 kW per unit, the mismatch might be typically on the order of 100-200 watts. In a conventional step-down transformer design, this would require a transformer capable of supplying the full 5.4 kW for the two supplies. In the design of the invention, however, transformer 2 need only be rated at 200 W, versus 5.4 kW total system power.

As long as both units are working normally, transformer 2 will operate within its rated capability. However, if one of the power converters, say 4a, suffers a fault, the remaining power converter 4b will continue to try to deliver power on output 8 connected to the load 3. This condition could result in over loading the balance transformer 2, resulting in additional failures.

In order to prevent this event, in the embodiment of FIG. 1, a monitor circuit is implemented in controller 7 that monitors an output 10a and 10b from power supplies 4a and 4b which has a signal representing the delivered output power from the supply. If the controller 7 determines there is a mismatch between 10a and 10b greater than a predetermined safe value, it electronically asserts the shutdown signal on 9a and 9b which shuts both power supplies 4a and 4b down to prevent transformer 2 from over-heating.

Figure 2:
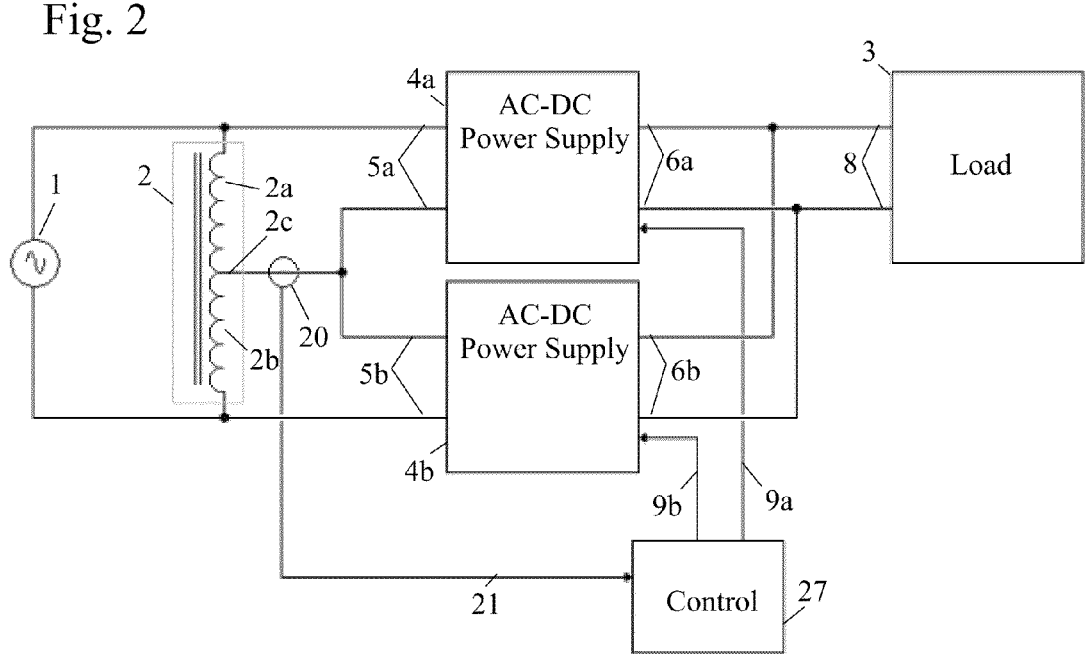
FIG. 2 shows a block diagram of a second embodiment of the invention.

FIG. 2 presents an alternate method to detect and protect against balance transformer over-dissipation.

In FIG. 2, the current on center tap 2c of balance transformer 2 is monitored by a current sensor 20. The signal output 21 from the current sensor 20 is input to controller 27.

Under normal circumstances the current on center-tap 2c is below a well-defined threshold. If for some reason signal 21 representing the current on center tap 2c indicates that the current exceeds this threshold, a potential transformer over-current situation is indicated. The controller 27 would then assert the shutdown signal on 9a and 9b, which would cause both power supplies 4a and 4b to shut down so as to protect the transformer 2.

Figure 3:
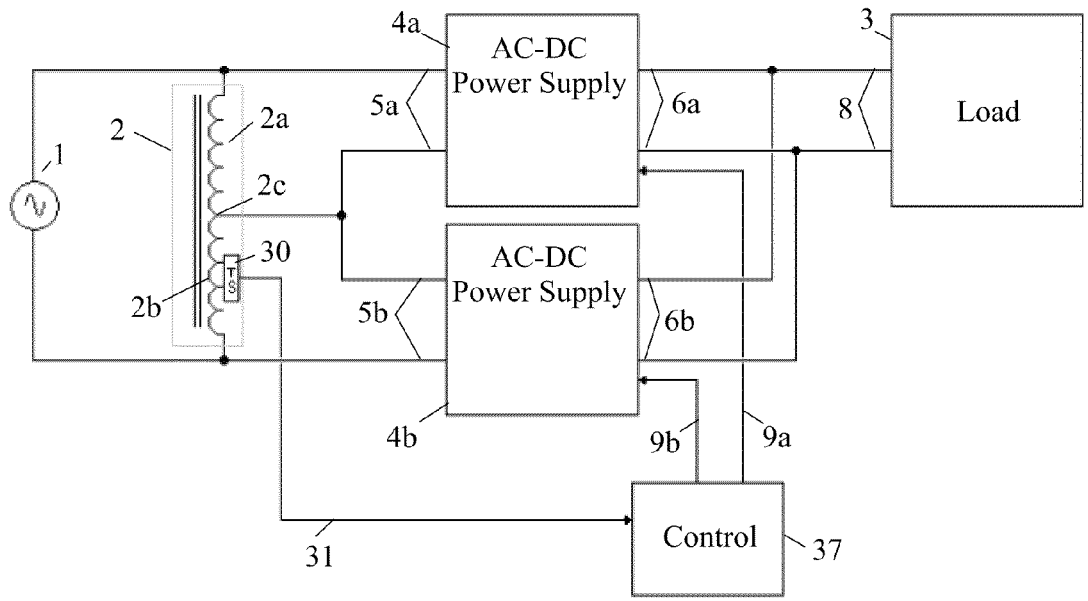
FIG. 3 shows a block diagram of a third embodiment of the invention.
Figure 5:
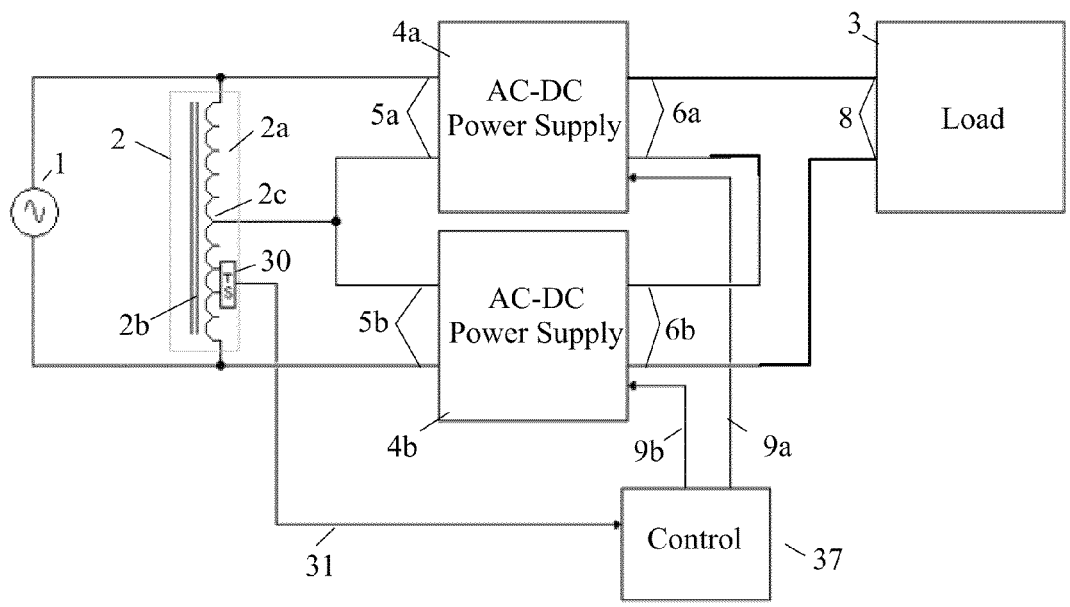
FIG. 5 shows a block diagram of a fourth embodiment of the invention.

FIGS. 3 and 5 present another alternate method to detect and protect against balance transformer over-dissipation.

In FIG. 3, the temperature of balance transformer 2 is monitored by a temperature sensor 30, which sends a signal on line 31 to controller 37. If the signal on 31 indicates that the sensor 30 has detected a temperature in excess of a predetermined safe level, then controller 37 would assert the shutdown signal on 9a and 9b, which would cause both power supplies 4a and 4b to shut down so as to protect the transformer 2.

Other protection schemes are also possible, such as monitoring the difference between the input voltages 5a 5b on each supply 4a 4b and asserting a shut-down signal on 9a 9b if this difference in voltage is determined to be above a predetermined level.

FIG. 5 differs from FIG. 3 in that FIG. 5 shows the outputs 6a and 6b of power supplies 4a and 4b connected in series, rather than in parallel as in the other figures. It will be understood by one skilled in the art that using this arrangement, the voltages at the outputs 6a and 6b are summed at the power output 8, as opposed to the currents supplied by the two power supplies 4a and 4b being summed at output 8 in the parallel arrangements used FIGS. 1-4.

Figure 4:
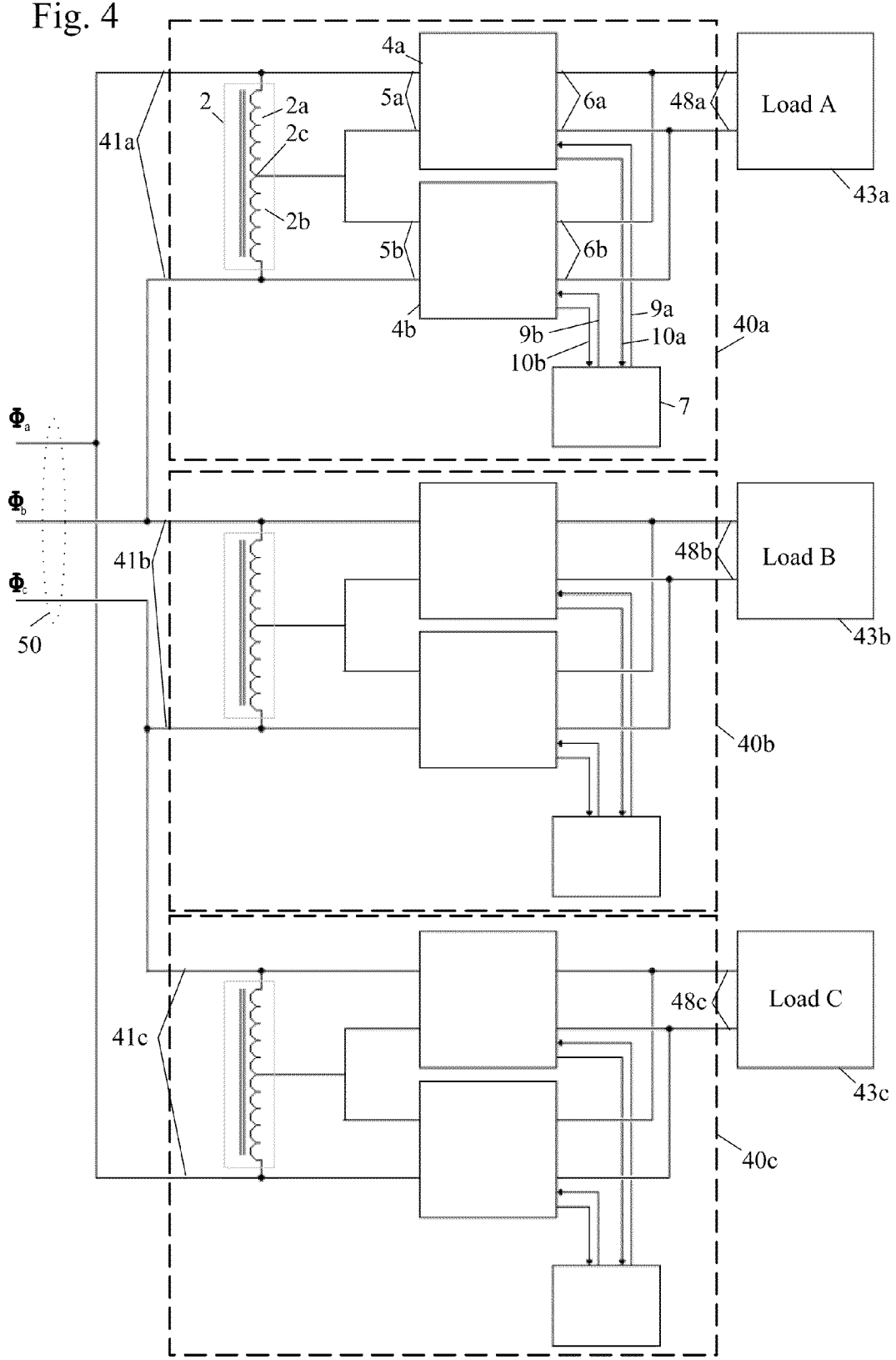
FIG. 4 shows a block diagram of multiple examples of the first embodiment of the invention, used to service a three phase power line.

FIG. 4 shows how three single-phase units 40a, 40b and 40c can be used to service a 380-480VAC, 3-phase "Delta" (i.e., 3-wire) power line 50. Each single-phase unit 40a-40c is, in this example, the circuit of the embodiment of FIG. 1. It will be understood that this is provided as an example, and any of the embodiments of the invention could be used.

Each of the single-phase units 40a 40b 40c has a power input connected to one of the phases of the power line 50. So, phase $\Phi_a$ is connected to input 41a of unit 40a, phase $\Phi_b$ is connected to input 41b of unit 40c, and phase $\Phi_c$ is connected to input 41c of unit 40c. Each single-phase power unit 40a-40c has an output 48a-48c connected to a load 43a-43c, as discussed above with respect to FIGS. 1-3.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method of using a first AC-DC power supply and a second AC-DC power supply to power a DC load from an AC source, each AC-DC power supply having a shutdown input, a DC voltage output and an AC voltage input requiring an AC voltage, in which the AC power source has an AC voltage higher than the AC voltage required by the AC voltage input of each of the power supplies, comprising:

a) coupling the AC source across a balancing transformer comprising a first winding and a second winding connected at a center tap;
b) coupling the AC voltage input of the first AC-DC power supply across the first winding of the balancing transformer;
c) coupling the AC voltage input of the second AC-DC power supply across the second winding of the balancing transformer;
d) coupling the DC power output from the first AC-DC power supply and the second AC-DC power supply together to form a DC power output for powering the DC load; and
e) a controller asserting a shutdown signal on the shutdown inputs of the power supplies in response to a signal at an input of the controller indicating an overload condition on the balancing transformer.

2. The method of claim 1, in which the signal at the input of the controller is from an output of at least one of the first AC-DC power supply and the second AC-DC power supply, the output having a signal representative of a current output from the at least one AC-DC power supply.

3. The method of claim 1, in which the signal at the input of the controller is from a sensor measuring current at the center tap of the balancing transformer.

4. The method of claim 1, in which the signal at the input of the controller is from a sensor measuring a temperature of the balancing transformer.

5. The method of claim 1, in which the DC power output from the first AC-DC power supply and the second AC-DC power supply are coupled in parallel to form the DC power output.

6. The method of claim 1, in which the DC power output from the first AC-DC power supply and the second AC-DC power supply are coupled in series to form the DC power output.

7. An AC-DC power supply unit for powering a DC load from an AC power source having a source voltage, comprising:

a) a balancing transformer comprising a first winding and a second winding connected in series, each winding having a first end and a second end, the second end of each winding being connected to a center tap, the first end of each winding forming an input for AC voltage from the AC power source;
b) a first AC-DC power supply having a shutdown input, a DC voltage output and an AC voltage input coupled across the first winding of the balancing transformer, wherein a signal asserted on the shutdown input causes the first AC-DC power supply to shut down;
c) a second AC-DC power supply having a shutdown input, a DC voltage output and an AC voltage input coupled across the second winding of the balancing transformer, wherein a signal asserted on the shutdown input causes the second AC-DC power supply to shut down;
the DC power output from the first AC-DC power supply and the DC output from the second AC-DC power supply being connected together to form a DC power output for powering the DC load;
d) a controller having at least one input and a shutdown output coupled to the shutdown input of the first AC-DC power supply and the shutdown input of the second AC-DC power supply, wherein when the controller receives a signal at the at least one input representing an overload condition of the balancing transformer, the controller asserts a shutdown signal on the shutdown output of the controller; and wherein a voltage required at the AC voltage input of the first AC-DC power supply and a voltage required at the AC voltage input of the second AC-DC power supply are both one-half of the source voltage of the AC source.

8. The power supply unit of claim 7, in which:
the first AC-DC power supply further comprises a current sense output having a signal representing a current supplied on the DC output of the first AC-DC power supply, coupled to an input of the controller;
the second AC-DC power supply further comprises a current sense output having a signal representing a current supplied on the DC output of the second AC-DC power supply, coupled to an input of the controller; and
the controller determines an overload condition of the balancing transformer if the signals representing the current supplied by the first AC-DC power supply or the second AC-DC power supply exceed a determined value.

9. The power supply unit of claim 7, in which:
the power unit further comprises a current sensor on the center tap of the balancing transformer having an output representing a current on the center tap; and
the controller determines an overload condition of the balancing transformer if the signal representing the current on the center tap of the balancing transformer exceeds a determined value.

10. The power supply unit of claim 7, in which:
the power unit further comprises a temperature sensor on the balancing transformer having an output representing a temperature of the balancing transformer; and
the controller determines an overload condition of the balancing transformer if the signal representing the temperature of the balancing transformer exceeds a determined value.

11. The power supply unit of claim 7, in which the DC power output from the first AC-DC power supply and the second AC-DC power supply are coupled in parallel to form the DC power output.

12. The power supply unit of claim 7, in which the DC power output from the first AC-DC power supply and the second AC-DC power supply are coupled in series to form the DC power output.

13. An AC-DC power supply for powering at least one DC load from a three-phase AC power source having a source voltage at each of three phases, comprising three power units, each power unit comprising:
a) a power input for connection to one of the three phases of the three-phase AC source;
b) a balancing transformer comprising a first winding and a second winding connected in series, each winding having a first end and a second end, the second end of each winding being connected to a center tap, the first end of each winding being connected to the power input;
c) a first AC-DC power supply having a shutdown input, a DC voltage output and an AC voltage input coupled across the first winding of the balancing transformer, wherein a signal asserted on the shutdown input causes the first AC-DC power supply to shut down;
d) a second AC-DC power supply having a shutdown input, a DC voltage output and an AC voltage input coupled across the second winding of the balancing transformer, wherein a signal asserted on the shutdown input causes the second AC-DC power supply to shut down;
the DC power output from the first AC-DC power supply and the DC output from the second AC-DC power supply being connected together to form a DC power output for powering at least one DC load;
e) a controller having at least one input and a shutdown output coupled to the shutdown input of the first AC-DC power supply and the shutdown input of the second AC-DC power supply, wherein when the controller receives a signal at the at least one input representing an overload condition of the balancing transformer, the controller asserts a shutdown signal on the shutdown output of the controller; and
wherein a voltage required at the AC voltage input of the first AC-DC power supply and a voltage required at the AC voltage input of the second AC-DC power supply are both one-half of the source voltage at the power input from one phase of the AC source.

14. The power supply of claim 13, in which in each of the three power units:
the first AC-DC power supply further comprises a current sense output having a signal representing a current supplied on the DC output of the first AC-DC power supply, coupled to an input of the controller;
the second AC-DC power supply further comprises a current sense output having a signal representing a current supplied on the DC output of the second AC-DC power supply, coupled to an input of the controller; and
the controller determines an overload condition of the balancing transformer if the signals representing the current supplied by the first AC-DC power supply or the second AC-DC power supply exceed a determined value.

15. The power supply of claim 13, in which in each of the three power units:
the power unit further comprises a current sensor on the center tap of the balancing transformer having an output representing a current on the center tap; and
the controller determines an overload condition of the balancing transformer if the signal representing the current on the center tap of the balancing transformer exceeds a determined value.

16. The power supply of claim 13, in which:
the power unit further comprises a temperature sensor on the balancing transformer having an output representing a temperature of the balancing transformer; and
the controller determines an overload condition of the balancing transformer if the signal representing the temperature of the balancing transformer exceeds a determined value.

17. The power supply of claim 13, in which the DC power output from the first AC-DC power supply and the second AC-DC power supply are coupled in parallel to form the DC power output.

18. The power supply of claim 13, in which the DC power output from the first AC-DC power supply and the second AC-DC power supply are coupled in series to form the DC power output.

* * * * *